(12) United States Patent
Battello et al.

(10) Patent No.: US 8,390,241 B2
(45) Date of Patent: Mar. 5, 2013

(54) MOTOR DRIVE BASED ON III-NITRIDE DEVICES

(75) Inventors: Mario Battello, Los Angeles, CA (US); Stephen Oliver, Andover, MA (US)

(73) Assignee: International Rectifier Corporation, El Segundo, CA (US)

(*) Notice: Subject to any disclaimer, the term of this patent is extended or adjusted under 35 U.S.C. 154(b) by 100 days.

(21) Appl. No.: 13/009,249

(22) Filed: Jan. 19, 2011

(65) Prior Publication Data
US 2011/0175559 A1 Jul. 21, 2011

Related U.S. Application Data

(63) Continuation of application No. 11/397,267, filed on Apr. 4, 2006, now Pat. No. 7,876,064.

(60) Provisional application No. 60/668,757, filed on Apr. 5, 2005.

(51) Int. Cl.
*H02P 27/04* (2006.01)
(52) U.S. Cl. .......... 318/801; 318/805; 318/812
(58) Field of Classification Search .......... 318/801, 318/805, 812, 400.27; 363/34
See application file for complete search history.

(56) References Cited

U.S. PATENT DOCUMENTS

2010/0127652 A1* 5/2010 Morita et al. ........ 318/400.27

* cited by examiner

*Primary Examiner* — Karen Masih
(74) *Attorney, Agent, or Firm* — Farjami & Farjami LLP

(57) ABSTRACT

An inverter for driving a motor includes one or more power stages for producing one or more power signals for energizing the motor, each power stage including first and second III-nitride based bi-directional switching devices connected in series between a DC voltage bus and ground.

20 Claims, 3 Drawing Sheets

US 8,390,241 B2

MOTOR DRIVE BASED ON III-NITRIDE DEVICES

This is a continuation of application Ser. No. 11/397,267 filed Apr. 4, 2006, now U.S. Pat. No. 7,876,064.

RELATED APPLICATIONS

This application is based on and claims priority to U.S. Provisional Application No. 60/668,757, filed on Apr. 5, 2005, by Mario Battello and Stephen Oliver, entitled, "INVERTER AMPLIFIER FOR MOTOR DRIVE APPLICATION USING BI-DIRECTIONAL SWITCH," the contents of which are herein incorporated by reference.

BACKGROUND OF THE INVENTION

1. Field of the Invention

This invention relates to inverters for motor drives and more specifically, relates to inverters that include III-nitride based power semiconductor devices.

2. Description of the Art

Referring to FIG. 1, there is shown a schematic of a motor drive 102 for a three phase AC electric motor 130 according to the prior art. Motor 130 may be an induction motor or a brushless DC (BLDC) motor, for example. Motor 130 includes a stator having a three winding system A, B, and C and further includes a rotor having a shaft, the rotor/shaft being disposed within the stator (note that FIG. 1 does not show the stator, rotor, and shaft). Motor drive 102 includes a controller 104 and an inverter 110. Inverter 110 is a three phase inverter that includes three power stages 118, 119, and 120 that are connected in parallel across a DC voltage bus 106 and ground lead 108. Each power stage is connected to a respective one of the three windings A, B, and C of motor 130. Controller 104 is connected to each of the power stages through six control leads, labeled 105a-f, and provides on these leads control signals that configure the three power stages to generate power signals that drive motor 130. In particular, through the control signals provided by controller 104, power stages 118-120 of inverter 110 produce three, phase-displaced AC power signals that energize windings A, B, and C of motor 130, thereby generating a rotating magnetic field that excites the motor rotor and thereby spins the motor shaft.

Referring more specifically to inverter 110, each power stage 118-120 of the inverter includes a high side switch and a low switch, labeled as 112a-f, that are connected in series across DC voltage bus 106 and ground lead 108. Each winding A, B, and C of motor 130 is connected at the junction of a respective high side and low side switch of each stage.

As is known, the current through motor windings A, B, and C changes direction during the motor operation. Accordingly, each high side and low side switch 112a-f of each power stage 118-120 is configured to include two power devices, including a unidirectional switch 114a-f, such as an IGBT, and a diode 116a-f that is short-circuited across the source and drain of the unidirectional switch. Unidirectional switches 114a-f handle the forward current through switches 112a-f and diodes 116a-f handle the reverse current through switches 112a-f.

As shown in FIG. 1, the gate of each unidirectional switch 114a-f is connected to a respective control lead 105a-f of controller 104. In general, controller 104 generates control signals on the control leads that turn "on" and "off" the high side and low side switches 114a-f of the power stages, effectively transitioning the inverter through various configurations and thereby causing the inverter to produce the three, phase-displaced AC power signals that energize motor windings A, B, and C of motor 130.

Inverter 110 has several limitations as a result of diodes 116. In particular, the diodes have a larger voltage drop than switches 114 and as such, have a higher power dissipation than the switches. In addition, as controller 104 transitions the inverter through the different configurations and causes the diodes to transition from a conducting to a non-conducting state (i.e., "on" to "off"), the diodes discharge a reverse recovery charge ($Q_\pi$) that causes both a power loss in the switches and a radiated and conducted EMI noise.

For example, assume controller 104 has configured inverter 110 as shown in FIG. 2. Here, high side switch 114a and low side switches 114d and 114f are "on". In addition to an energized current that flows through windings A and B, this configuration allows an inductive current to flow through winding C to winding B, down through switch 114d of stage 119 to ground lead 108, up through diode 116f of stage 120, and back to winding C. Accordingly, in this configuration, diode 116f is effectively "on" and operates as a flywheel diode that keeps the current in the motor windings flowing in the correct direction.

Assume next that controller 104 transitions inverter 110 to a configuration where low side switch 114f is "on" such that a current now flows through the switch to ground lead 108. In this configuration, diode 116f is effectively forced "off" by switch 114f. Notably, as diode 116f is turned "off", a $Q_\pi$ charge stored in the diode is discharged and must be removed. The removing of this charge is performed by switch 114f, and results in a turn-on switching/power loss in the switch. Notably, similar switching losses occur in the other power stages of inverter 110 as the diodes are forced "off". These switching losses caused by the flywheel diodes of inverter 110 effect the thermal performance of the inverter, reduce the power density of the inverter, and increase cost. In addition, the removal of the stored $Q_\pi$ charge by the switches also increases radiated and conducted EMI noise in the drive.

Notably, the switching losses and EMI noise caused by the diodes may be reduced by using diodes with a fast reverse recovery time (i.e., a small $t_\pi$ value). However, reducing the reverse recovery time of the diodes increases other radiated and conducted EMI noise in inverter 110. For example, assume controller 104 has configured inverter 110 such that switches 114e and 114f of stage 120 are "of" and "on" respectively, and current is flowing up through diode 116f. Assume next that controller 104 transitions inverter 110 to a configuration where switches 114e and 114f of stage 120 are now "on" and "off" respectively, and diode 116f is forced "off". As this occurs, the junction of switches 114e and 114f (i.e., the connection point of winding C) swings from 0 volts up to the voltage on DC voltage bus 106. This swing generates a sharp dV/dt as well as a fast di/dt, each of which are additional sources of radiated and conducted EMI noise. Again, similar radiated and conducted EMI noise will occur in the other power stages of inverter 110 as controller 104 transitions the inverter through the various configurations. Notably, the dV/dt may be limited by configuring the gate resistance ($R_g$) of the switches 114 and the di/dt may be controlled by configuring the diodes 116 to have a larger $t_\pi$ value. However, as indicated above, a larger $t_\pi$ value for the diodes increases power loss in the switches.

Accordingly, it is desirable to provide an inverter for a motor drive wherein the inverter in not limited by the adverse effects of the diodes.

BRIEF SUMMARY OF THE INVENTION

According to an embodiment of the invention, a motor drive includes an inverter operatively connected to a controller. The inverter is a three phase inverter that includes three power stages connected in parallel across a DC voltage bus and a ground lead. According to an embodiment of the invention, each power stage includes a high side and a low side III-nitride based bi-directional switching device, such as a GaN-based device. The two switching devices for a given power stage are connected in series at respective power electrodes. Each winding of a three phase motor is connected to a respective power stage and in particular, at the junction of the high side and low side switches.

According to an embodiment of the invention, each bi-directional switching device includes two independent gate leads that control the forward and reverse conducting paths of the switch. According to an embodiment of the invention, the two gate leads of each switching device are connected to respective control leads of the controller. In this way, the controller may configure any given switch to conduct current in the forward direction or the reverse direction. In operation, the controller may be configured so as to produce control signals on the control leads to configure the forward and reverse conducting paths of each switch to generate three, phase-displaced AC power signals that energize the motor windings.

Significantly, the bi-directional switching devices of the inverter of the present invention overcome the limitations caused by the diodes of prior motor drive inverters. Specifically, the bi-directional switching devices have lower power dissipation as compared to the diodes, thereby reducing power loss. The bi-directional switching devices also overcome the turn-on switching losses and EMI noise caused by the diodes discharging the $Q_\pi$ charge as the diodes are turned "off". Specifically, because each bi-directional switch of the present invention has two gates, the controller is able to turn the forward conducting path of a switch "on" and the reverse conducting path of the switch "off", rather than having the reverse conducting path forced "off", as with a diode. As a result, there is no stored charge available to boost switching loss and to produce radiated and conducted EMI noise. Accordingly, the bi-directional switches of the inverter of the present invention result in a motor drive that has reduced power loss, improved thermal performance, higher power density, lower cost, and reduced EMI noise.

The motor drive of the present invention also addresses the radiated and conducted EMI noise caused by the sharp dV/dt and fast di/dt that results as the high side switch of a power stage transitions from an "off" to an "on" configuration and the low side switch moves from a reverse conducting state to a non-conducting state. Specifically, the EMI noise caused by the sharp voltage change may be limited by configuring the gate resistance of the gates of the bi-directional switches. As for the noise caused by the fast change in current, according to an embodiment of the invention, the controller may synchronize the reconfiguration of the high side and low side bi-directional switches such that the reverse conducting path of the low side switch is turned "off" before the forward conducting path of the high side switch is turned "on". In general, this technique is comparable to the synchronous rectification technique used in switch mode power supplies. Accordingly, the inverter of the present invention allows for the transitional noise to be controlled while also not incurring a power loss, unlike prior systems.

Other features and advantages of the present invention will become apparent from the following description of the invention, which refers to the accompanying drawings.

DETAIL DESCRIPTION OF THE INVENTION

Figure 3:
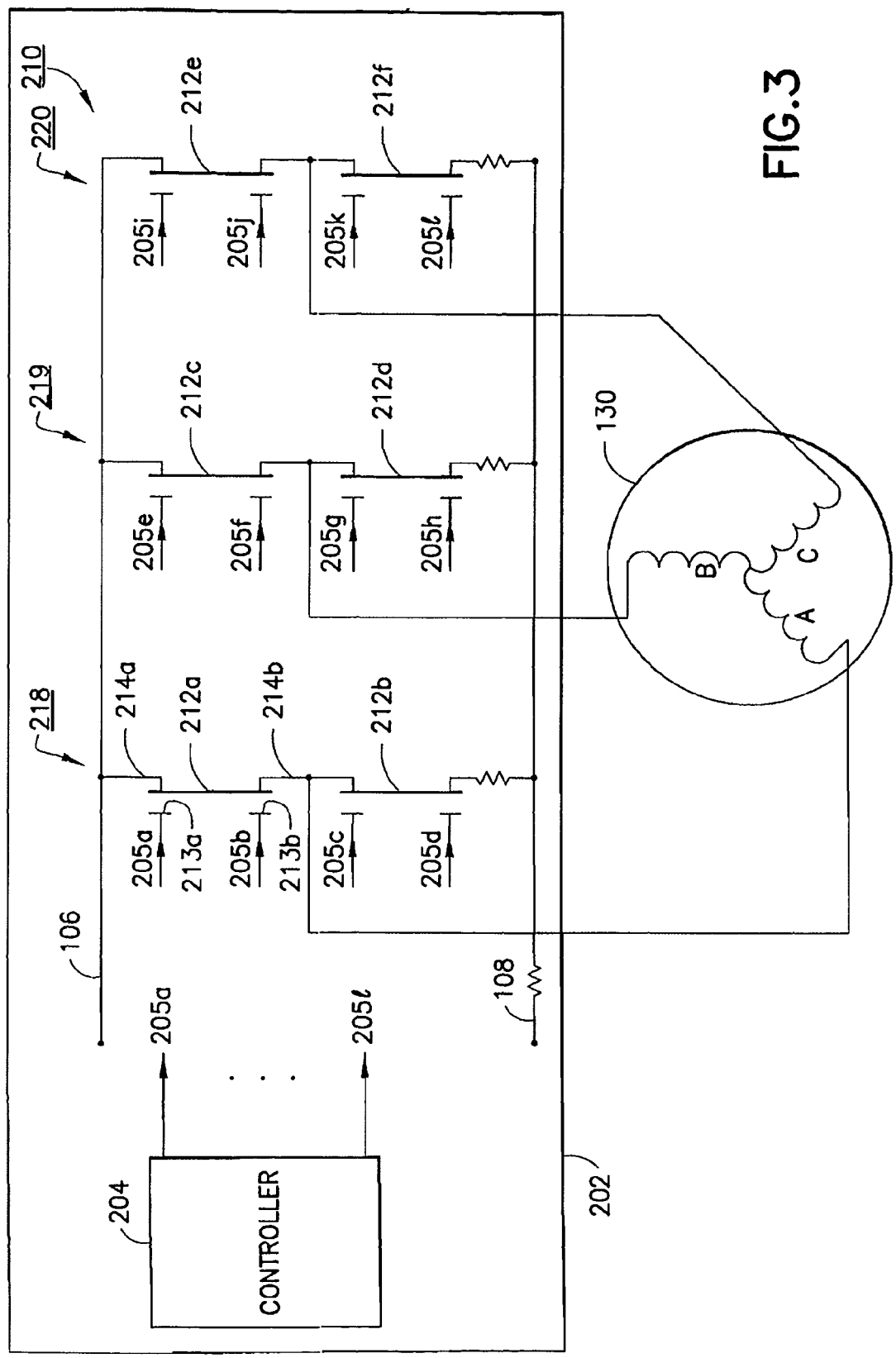
FIG. 3 shows a schematic of a three phase inverter of a motor drive according to an embodiment of the invention.

Referring to FIG. 3, there is shown a schematic of a motor drive 202 for a three phase AC electric motor 130 according to an embodiment of the invention. As described above, motor 130 includes three windings A, B, and C and may be an induction motor or a BLDC motor, for example, and in particular, may be a servo motor, for example. Motor drive 202 includes a controller 204 and an inverter 210. As shown in FIG. 3, inverter 210 is a three phase inverter that includes three power stages 218, 219, and 220 that are connected in parallel across DC voltage bus 106 and ground lead 108. Each power stage is connected to a respective one of the three windings A, B, and C of motor 130. According to an embodiment of the invention, controller 204 includes twelve controls leads, labeled 205a-205L, which leads are connected to respective ones of power stages 218-220. In operation, controller 204 generates control signals on the control leads, which signals configure inverter 210 to produce three, phase-displaced AC power signals, one from each power stage. These power signals generate a rotating magnetic field through motor windings A, B, and C, which field excites the motor rotor and thereby spins the motor shaft.

Referring more specifically to inverter 210, according to an embodiment of the invention, each power stage 218-220 of the inverter includes two III-nitride based bi-directional switching devices 212a-f. Each switching device may be a GaN-based device, although other semiconductor alloys may be used to construct devices 212a-f. Each III-nitride based bi-directional switching device may have a form as disclosed in U.S. Publication No. U.S. 2005-0189561 (U.S. patent application Ser. No. 11/056,062), entitled "III-Nitride Bidirectional Switch," by Daniel M. Kinzer et al., and assigned to the assignee of the present application. The contents of U.S. Publication No. U.S. 2005-0189561 are hereby incorporated by reference as if fully set forth in its entirety herein.

In general, each switching device includes two power electrodes 214a and 214b, as shown by device 212a, with either electrode being able to serve as a drain or source electrode. According to a preferred embodiment of the invention, each switching device also includes two independent gate electrodes 213a and 213b, as shown by device 212a. By controlling each gate electrode of a given switch, the switch may conduct current in the forward direction (i.e., from voltage bus 106 towards ground lead 108) or in the reverse direction (i.e., from ground lead 108 towards voltage bus 106). Preferably, each bi-directional switch 212a-f of inverter 210 is a symmetrical switch such that both current directions have substantially the same channel characteristics (i.e., the same conduction and switching losses).

As shown in FIG. 3, each pair of switching devices for a given power stage is connected in series across DC voltage bus 106 and ground lead 108, with the two devices being connected at respective power electrodes and with the opposing power electrodes of each device being connected to either the voltage bus or ground lead. In particular, stage 218 includes high side switch 212a series connected to low side switch 212b, stage 219 includes high side switch 212c series connected to a low side switch 212d, and stage 220 includes a high side switch 212e series connected to a low side switch 212f. Each winding A, B, and C of motor 130 is connected at the junction of a respective high side and low side switch of each stage.

According to an embodiment of the invention and as shown in FIG. 3, the two gate leads of each switching device 212a-f are connected to respective control leads 205a-L of controller 204. In this configuration, controller 204 may configure any given switch 212a-f to conduct current in either the forward direction or the reverse direction, with the control of either direction being independent of the other. Accordingly, in operation of motor drive 202, controller 204 may be configured to produce control signals on control leads 205a-L such that for each power stage, each high side and low side switch is configured to conduct current in either the forward or reverse direction, thereby transitioning the inverter through various configurations to produce the three, phase-displaced AC power signals that energize the motor windings.

Significantly, bi-directional switching devices 212 of inverter 210 of the present invention overcome the limitations caused by the diodes of prior motor drive inverters, such as inverter 110. Specifically, the bi-directional switching devices have lower power dissipation as compared to the diodes, thereby reducing power loss. The bi-directional switching devices also overcome the turn-on switching losses and EMI noise caused by the diodes discharging the $Q_\pi$ charge as the diodes are turned "off". Specifically, as indicated above, when diodes 116 of inverter 110 operate as flywheel diodes and are subsequently forced "off" as the inverter changes configurations, there is turn-on switching/power loss in the switches 114 as the switches remove the $Q_\pi$ charge built up in the diodes. The removal of the $Q_\pi$ charge by the switches also increases radiated and conducted EMI noise. Notably, bi-directional switches 212 of inverter 210 remove this turn-on switching loss and radiated and conducted EMI noise.

Figure 1:
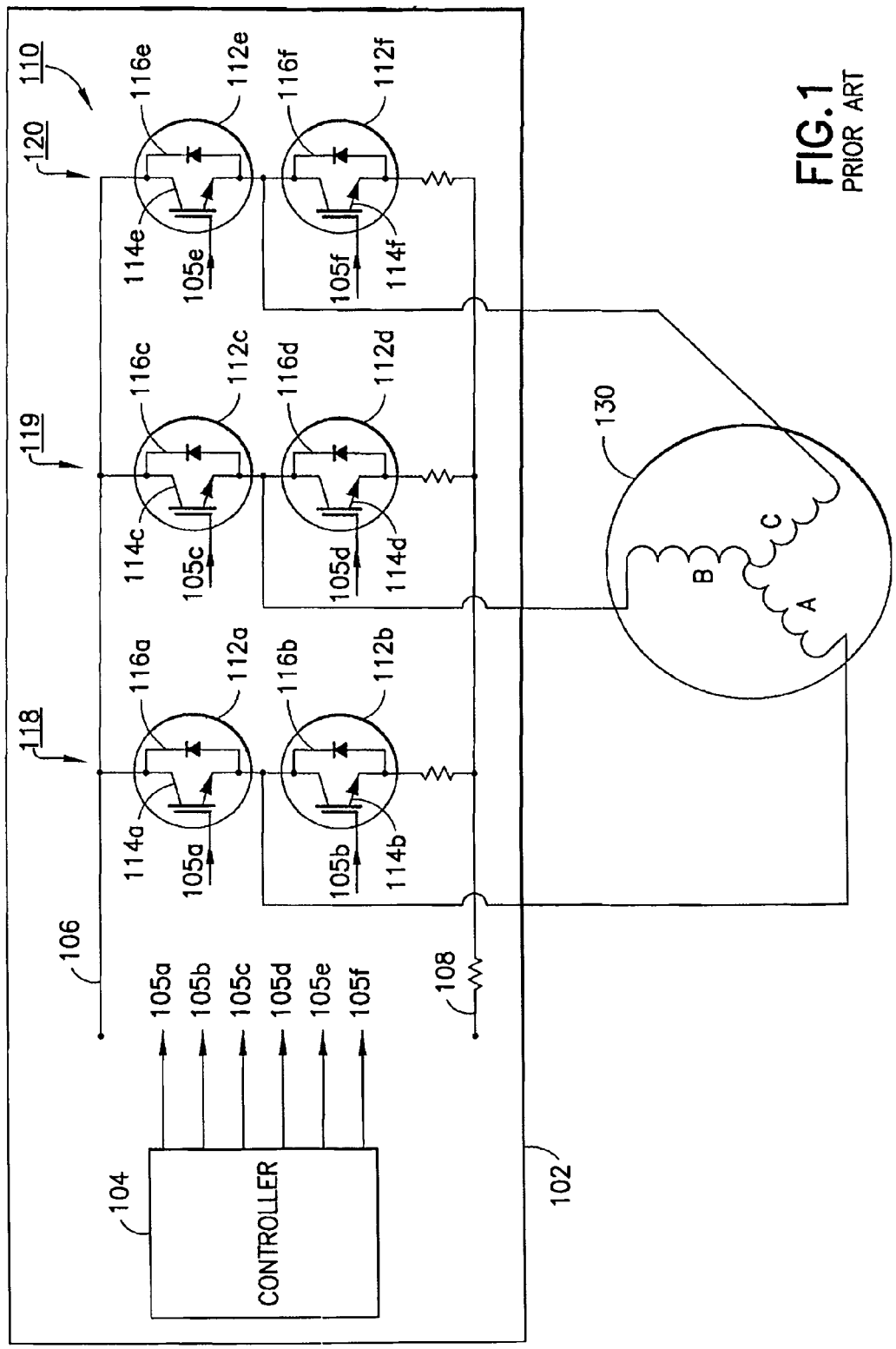
FIG. 1 shows a schematic of a three phase inverter of a motor drive of the prior art.
Figure 2:
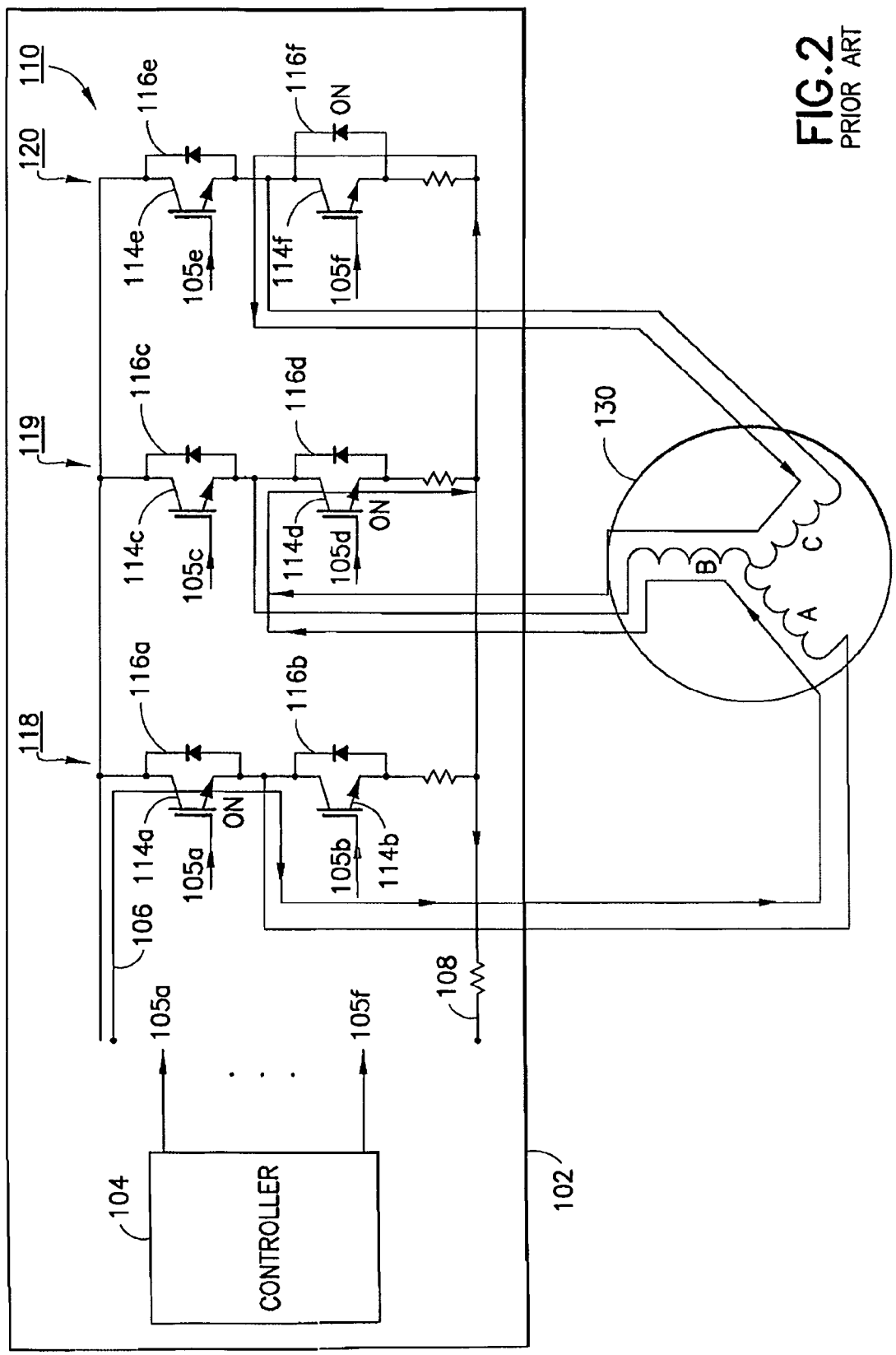
FIG. 2 shows an example configuration of the inverter of FIG. 1.

Specifically, assume for example, that controller 204 has configured inverter 210 to a configuration corresponding to FIG. 2 and in particular, has configured switch 212a of stage 218 and switch 212d of stage 219 such that the switches conduct current in the forward direction and has configured switch 212f of stage 220 such that the switch conducts current in the reverse direction. Here, switch 212f effectively operates as a "flywheel diode" as inductive current flows through winding C to winding B of motor 130, down through switch 212d to ground lead 108, up through switch 212f, and back to winding C. Assume next that controller 204 transitions inverter 210 to a configuration where switch 212f now conducts current in the forward direction, rather than the reverse direction (i.e., the transition of the prior art inverter in which the flywheel diode discharges the $Q_\pi$ charge). Because switch 212f has two gate electrodes, controller 204 is able to turn the forward conducting path "on" and the reverse conducting path "off", rather than having the reverse conducting path be forced "off", as with a diode. As a result, there is no stored charge available to boost switching loss and to produce radiated and conducted EMI noise. Accordingly, the bi-directional switches of inverter 210 result in a motor drive that has reduced power loss, improved thermal performance, higher power density, lower cost, and reduced EMI noise.

Significantly, motor drive 202 of the present invention also addresses the radiated and conducted EMI noise seen in inverter 110 as the high side switch 114 of a power stage transitions from an "off" to an "on" configuration and the low side diode 116 moves from a conducting state to a non-conducting state. Specifically, as indicated above, this transition results in the junction of the high side and low side switches of a power stage swinging from 0 volts up to the voltage on DC voltage bus 106. This swing generates a sharp dV/dt as well as a fast di/dt, each of which are additional sources of radiated and conducted EMI noise. As indicated, the change in voltage may be limited by configuring the gate resistance of the switches and the change in current may be controlled by configuring the diodes to have a larger $t_\pi$ value. However, as indicated above, the larger $t_\pi$ value increases switching/power loss.

Notably, a similar noise may occur in inverter 210 as a high side switch of a power stage is configured to conduct current in the forward direction while the low side switch of the power stage is configured to stop conducting current in the reverse direction. However, according to an embodiment of the invention, the bi-directional switches of inverter 210 allow for this noise to be controlled while also not incurring a switching/power loss.

Specifically, the EMI noise caused by the sharp voltage change may be limited by configuring the gate resistance of the gates of switches 212. As for the noise caused by the fast change in current, because controller 204 is able to turn "off" the reverse conducting path through a switch, rather than this path being automatically forced off as with a diode, the controller may be configured to synchronize the reconfiguration of the high side and low side switches. Specifically, according to an embodiment of the invention, controller 204 may synchronize the reconfiguration of the high side and low side switches such that the reverse conducting path of the low side switch is turned "off" before the forward conducting path of the high side switch is turned "on". In general, this technique is comparable to the synchronous rectification technique used in switch mode power supplies. Accordingly, the bi-directional switches of inverter 210 allow for the transitional noise to be controlled while also not incurring a power loss.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An inverter circuit comprising:
at least first and second third power stages;
each of said at least first and second power stages including first and second III-nitride based switching devices connected in series with an output node in-between, said output node for providing a power signal to a load;
said first and second III-nitride based switching devices each comprising at least two terminals.

2. The inverter circuit of claim 1, wherein each of said first and second III-nitride based switching devices is a GaN-based device.

3. The inverter circuit of claim 1, wherein said at least two terminals comprise first and second gate electrodes.

4. The inverter circuit of claim 1, wherein each of said first and second III-nitride based switching devices comprise at least one gate electrode.

5. The inverter circuit of claim 3, further comprising a controller operatively connected to each of said first and second gate electrodes of each of said first and second III-nitride based switching devices and configured to provide control signals to said first and second III-nitride based switching devices.

6. The inverter circuit of claim 5, wherein said control signals configure said first and second III-nitride based switching devices to produce said power signal.

7. The inverter circuit of claim 5, wherein said controller includes a plurality of control leads for providing said control signals.

8. The inverter circuit of claim 1, wherein each of said first and second III-nitride based switching devices includes a forward conducting path and a reverse conducting path.

9. The inverter circuit of claim 8, wherein said forward conducting path and said reverse conducting path of each of said first and second III-nitride based switching devices have substantially same channel characteristics.

10. The inverter circuit of claim 8, wherein said reverse conducting path of each of said first and second III-nitride based switching devices operates as a flywheel diode.

11. The inverter circuit of claim 8, further comprising a controller operatively connected to each of said first and second III-nitride based switching devices and configured to control a turning on and a turning off of said forward conducting path and said reverse conducting path of each of said first and second III-nitride based switching devices.

12. The inverter circuit of claim 11, wherein for each of said at least first and second power stages, said controller is configured to turn off said reverse conducting path of said second III-nitride based switching device prior to turning on said forward-conducting path of said first III-nitride based switching device.

13. An inverter circuit comprising:
at least one power stage;
said at least one power stage including a high-side III-nitride based switching device and a low side III-nitride based switching device connected in series with an output node in-between, said output node for providing a power signal to a load;
said high-side III-nitride based switching device and said low side III-nitride based switching device each comprising at least two terminals.

14. The inverter of claim 13, wherein said at least one power stage comprises three power stages.

15. The inverter circuit of claim 13, wherein said high side and said low side III-nitride based switching devices are GaN-based devices.

16. The inverter circuit of claim 13, wherein said high side and said low side III-nitride based switching devices each include a forward conducting path and a reverse conducting path.

17. The inverter circuit of claim 16, wherein said reverse conducting path of said high side and said low side III-nitride based switching devices operates as a flywheel diode.

18. The inverter circuit of claim 16, further comprising a controller operatively connected to said high side and said low side III-nitride based switching devices and configured to control a turning on and a turning off of said forward conducting path and said reverse conducting path of each of said high side and said low side III-nitride based switching devices.

19. The inverter circuit of claim 18, wherein said controller includes a plurality of control leads for providing control signals to said high side and said low side III-nitride based switching devices.

20. The inverter circuit of claim 13, wherein said at least two terminals comprise first and second gate electrodes.

* * * * *

UNITED STATES PATENT AND TRADEMARK OFFICE
CERTIFICATE OF CORRECTION

| | | |
|---|---|---|
| PATENT NO. | : 8,390,241 B2 | Page 1 of 1 |
| APPLICATION NO. | : 13/009249 | |
| DATED | : March 5, 2013 | |
| INVENTOR(S) | : Battello et al. | |

It is certified that error appears in the above-identified patent and that said Letters Patent is hereby corrected as shown below:

In the claims, column 6, line 44, "at least first and second third power stages;" should be changed to --at least first and second power stages;--.

Signed and Sealed this
Seventh Day of May, 2013

Teresa Stanek Rea
*Acting Director of the United States Patent and Trademark Office*